(12) United States Patent
Takeuchi et al.

(10) Patent No.: US 12,242,683 B2
(45) Date of Patent: *Mar. 4, 2025

(54) DEVICES AND METHODS FOR CONTROLLING PROXIMITY SENSING IN INPUT-DISPLAY DEVICE

(71) Applicant: Synaptics Incorporated, San Jose, CA (US)

(72) Inventors: Makoto Takeuchi, Kanagawa (JP); Hirokazu Hatayama, Kanagawa (JP); Masaaki Shiomura, Tokyo (JP); Nobukazu Tanaka, Tokyo (JP); Daisuke Ito, Tokyo (JP); Takayuki Noto, Tokyo (JP); Takashi Miyamoto, Toyko (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,522

(22) Filed: Jan. 3, 2024

(65) Prior Publication Data

US 2024/0134474 A1    Apr. 25, 2024

Related U.S. Application Data

(63) Continuation of application No. 17/712,936, filed on Apr. 4, 2022, now Pat. No. 11,907,453.

(51) Int. Cl.
*G06F 3/041* (2006.01)
(52) U.S. Cl.
CPC ........ *G06F 3/0412* (2013.01); *G06F 3/04182* (2019.05)

(58) Field of Classification Search
CPC ...... G06F 3/041–047; G06F 2203/041–04114; G06F 2203/04101; G06F 3/04886; G06F 2203/04108; G06F 3/04182; G06F 3/0412; H10K 59/40; G09G 2340/0435; H03K 17/945
See application file for complete search history.

(56) References Cited

U.S. PATENT DOCUMENTS

| | | | |
|---|---|---|---|
| 9,268,433 B2 | 2/2016 | Al-Dahle et al. | |
| 2010/0271356 A1 | 10/2010 | Ogita | |
| 2015/0309618 A1 | 10/2015 | Keppel et al. | |
| 2015/0346987 A1 | 12/2015 | Ren et al. | |
| 2016/0240154 A1* | 8/2016 | Forutanpour | G09G 3/3644 |
| 2021/0149540 A1* | 5/2021 | Shikata | G09G 3/20 |
| 2021/0397324 A1 | 12/2021 | Yu et al. | |
| 2022/0075475 A1 | 3/2022 | Jeon | |
| 2022/0137773 A1 | 5/2022 | Lim | |

* cited by examiner

*Primary Examiner* — Sanjiv D. Patel
(74) *Attorney, Agent, or Firm* — Leydig, Voit & Mayer, Ltd.

(57) ABSTRACT

A display driver includes a driver circuit and a sensing controller. The driver circuit is configured to drive a display panel according to display information. The display panel defines a sensing region. The sensing controller interface circuit is configured to transmit an output vertical sync signal to a proximity sensing controller. The proximity sensing controller is configured to generate positional information of an input object based at least in part on a resulting signal received from a sensor electrode disposed in the sensing region. The output vertical sync signal comprises encoding the display information in the output vertical sync signal.

20 Claims, 14 Drawing Sheets

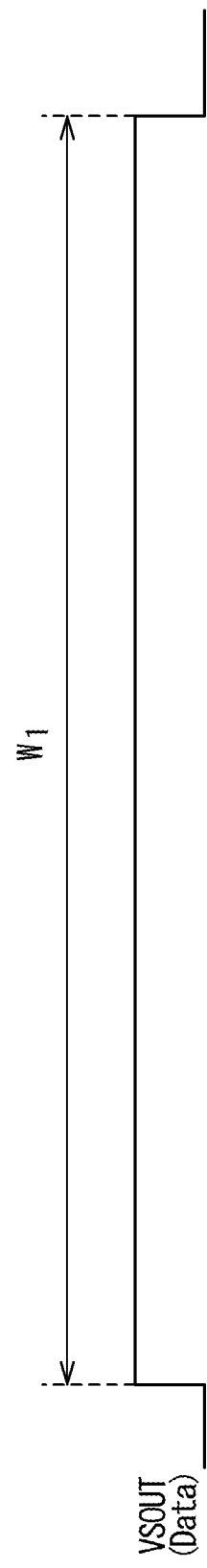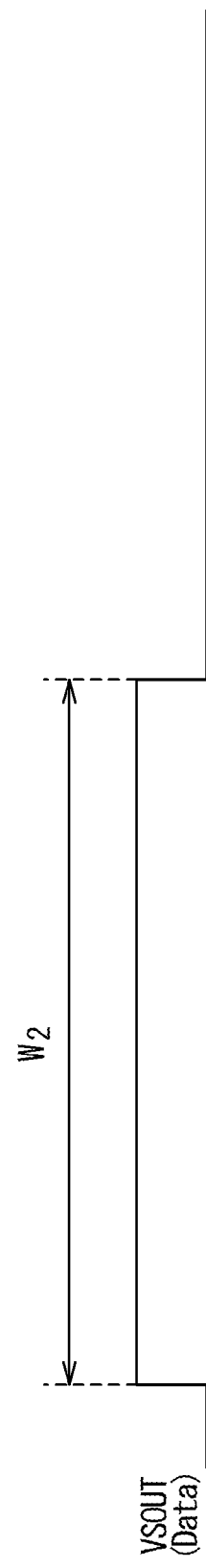

A sensing region. The display driver interface circuit is further configured to retrieve the display information encoded in the output vertical sync signal. The proximity sensing circuit is configured to generate positional information of an input object based at least in part on a resulting signal received from a sensor electrode disposed in the sensing region. The control circuit is configured to control an operation of the proximity sensing circuit based at least in part on the display information.

DEVICES AND METHODS FOR CONTROLLING PROXIMITY SENSING IN INPUT-DISPLAY DEVICE

CROSS-REFERENCE TO RELATED APPLICATIONS

This application is a continuation of copending U.S. patent application Ser. No. 17/712,936, filed Apr. 4, 2022, which is hereby incorporated by reference in its entirety.

FIELD

The disclosed technology generally relates to proximity sensing, and more specifically, control or adjustment of proximity sensing in input-display devices.

BACKGROUND

Input-display devices adapted to both image displaying and proximity sensing are widely used as user-interfaces of electronic systems. An input-display device may include a display panel and an array of sensor electrodes disposed neighboring or integrated in the display panel. The input-display device may further include a display driver configured to update the display panel based on image data and a proximity sensing controller configured to sense one or more input objects located on or near the display panel based on resulting signals received from the sensor electrodes.

To improve the proximity sensing performance, it would be advantageous if the proximity sensing is dynamically controlled or adjusted depending on circumstances. The control of the proximity sensing may include, but not limited to, adjustment of the proximity sensing frequency, the proximity sensing report rate, and/or analog/digital signal processes (e.g., filtering and baselining). There is a need for providing improved architectures to dynamically control the proximity sensing.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a display driver is provided. The display driver includes a driver circuit and a sensing controller. The driver circuit is configured to drive a display panel according to display information. The display panel defines a sensing region. The sensing controller interface circuit is configured to transmit an output vertical sync signal to a proximity sensing controller. The proximity sensing controller is configured to generate positional information of an input object based at least in part on a resulting signal received from a sensor electrode disposed in the sensing region. The output vertical sync signal comprises encoded display information in the output vertical sync signal.

In one or more embodiments, a proximity sensing controller is provided. The proximity sensing controller includes a display driver interface circuit, a proximity sensing circuit, and a control circuit. The display driver interface circuit is configured to receive an output vertical sync signal from a display driver configured to drive a display panel according to display information. The display panel defines In one or more embodiments, a method for operating an input-display device is provided. The method includes driving, by a display driver, a display panel according to display information. The display panel defines a sensing region. The method further includes encoding the display information in an output vertical sync signal. The method further includes transmitting the output vertical sync signal from the display driver to a proximity sensing controller. The proximity sensing controller is configured to generate positional information of an input object based at least in part on a resulting signal received from a sensor electrode disposed in the sensing region. The method further includes controlling an operation of the proximity sensing controller based at least in part on the display information.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIGS. 6A and 6B show example encoding of display information into an output vertical sync signal, according to one or more embodiments.

Figure 1A:
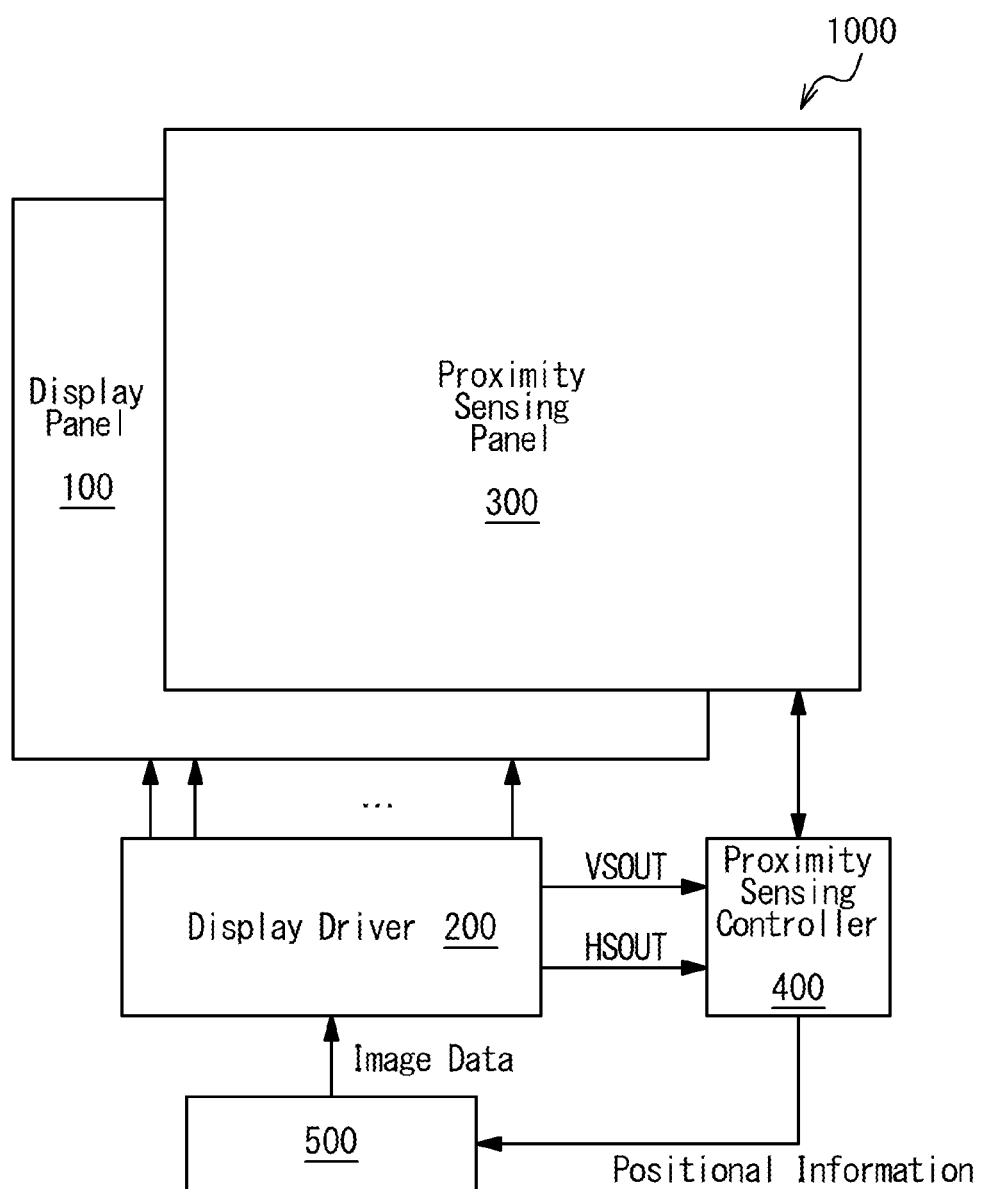
FIG. 1A shows an example configuration of an input-display device, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Input-display devices adapted to both image displaying and proximity sensing are often used as user-interfaces of electronic systems. The term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include automotive user interfaces configured to give drivers user interface capabilities.

An input-display device may be configured to display an image on the display panel while sensing one or more input objects in a sensing region of the input-display device. The display panel may define the sensing region by being at least one of the determinants of the sensing region. For example, the sensing region may be defined on or near the display panel. Other determinants of the sensing region may exist. The input-display device may include a display driver configured to drive or update the display panel based on image data and a proximity sensing controller configured to detect one or more input objects using an array of sensor electrodes disposed neighboring or integrated in the display panel. The proximity sensing controller may be configured to detect one or more input objects based on resulting signal received from the array of sensor electrodes.

To improve the proximity sensing performance, it would be advantageous if the proximity sensing is dynamically controlled or adjusted depending on circumstances. The adjustment of the proximity sensing may include, but not limited to, adjustment of the proximity sensing report rate and adjustment of the proximity sensing frequency. The proximity sensing report rate may correspond to the number of times of reporting the result of the proximity sensing (e.g., report positional information of a sensed input object) per unit time. The proximity sensing frequency may correspond to the frequency of a sensing signal applied to electrodes used for the proximity sensing. In embodiments where the proximity sensing is achieved through absolute capacitance sensing configured to modulate the sensor electrodes and detect changes in the absolute capacitances (or self-capacitances) of the sensor electrodes, the proximity sensing frequency may be the modulation frequency of the sensor electrodes. In embodiments where the proximity sensing is achieved through transcapacitance sensing configured to modulate transmitter electrodes and detect changes in the transcapacitances (or mutual capacitances) between the transmitter electrodes and sensor electrodes (also referred to as "receiver electrodes"), the proximity sensing frequency may be the modulation frequency of the transmitter electrodes. The proximity sensing performance may be measured as one or more of sensing accuracy, linearity, jitter, latency, false sensing, and the like.

The proximity sensing performance may be effectively improved by dynamically controlling the proximity sensing depending on image displaying settings. The image display settings may include, but not limited to, the display frame rate, the vertical/horizontal synchronization (sync) signal frequencies, partial image updating, and contents of the image to be displayed. For example, controlling the proximity sensing report rate based on the display frame rate may improve power consumption and/or optimize proximity sensing latency. The present disclosure provides improved architectures to dynamically controlling the proximity sensing depending on one or more image displaying settings.

In some embodiments, an input-display device includes a display driver and a proximity sensing controller. The display driver is configured to drive a display panel according to display information. The display panel defines a sensing region. The display driver is further configured to transmit an output vertical sync signal to a proximity sensing controller. The output vertical sync signal includes encoded display information. The proximity sensing controller includes a display driver interface circuit, a proximity sensing circuit, and a control circuit. The proximity sensing controller is configured to receive the output vertical sync signal from the display driver and retrieve the display information encoded in the output vertical sync signal. The proximity sensing controller includes a proximity sensing circuit configured to generate positional information of an input object based at least in part on a resulting signal received from a sensor electrode disposed in the sensing region. The proximity sensing controller is further configured to control the operation of the proximity sensing circuit based at least in part on the display information. By encoding the display information in the output vertical sync signal transmitted to the proximity sensing controller, the proximity sensing controller can dynamically control the operation of the proximity sensing circuit based on the display information while avoiding an increase in the number of signal lines disposed between the display driver and the proximity sensing circuit. The architecture based on the encoding of the display information into the output vertical sync signal may effectively enable dynamic adjustment of the proximity sensing with reduced hardware. In the following, a detailed description is given on various embodiments of the present disclosure.

FIG. 1A shows an example configuration of an input-display device 1000, according to one or more embodiments. The input-display device 1000 may be configured to provide a user interface for a user to interact with an electronic system (not shown). In the shown embodiment, the input-display device 1000 includes a display panel 100, a display driver 200, a proximity sensing panel 300, and a proximity sensing controller 400. In some embodiments, the display driver 200 and the proximity sensing controller 400 may be implemented as two discrete integrated circuits. In other embodiments, the display driver 200 and the proximity sensing controller 400 may be integrated in one integrated circuit (e.g., a touch and display driver integrated (TDDI) circuit). The display driver 200 is configured to receive image data from a host 500 and drive the display panel 100 based on the image data to display an image corresponding to the image data. Examples of the host 500 include an application processor, a central processing unit (CPU), a special purpose processor, and other types of processors. The proximity sensing controller 400 is configured to perform proximity sensing to detect one or more input objects based on resulting signals received from the proximity sensing panel 300. As used herein, the proximity sensing includes touch sensing (e.g., contact on the proximity sensing panel 300 and/or the display panel 100). Examples of input objects include user's fingers and styli. The proximity sensing controller 400 is further configured to generate and provide positional information of the one or more sensed input objects to the host 500.

In one or more embodiments, to synchronize the image displaying by the display driver 200 and the proximity sensing by the proximity sensing controller 400, the display driver 200 is configured to transmit an output vertical sync signal VSOUT and an output horizontal sync signal HSOUT to the proximity sensing controller 400. The output vertical sync signal VSOUT is synchronous with a vertical sync signal that is generated in the display driver 200 to define display frame periods (or vertical sync periods). Correspondingly, the output horizontal sync signal HSOUT is synchronous with a horizontal sync signal that is generated in the display driver 200 to define line periods (or horizontal sync periods). The proximity sensing controller 400 is configured to control timing of the proximity sensing using the output vertical sync signal VSOUT and the output horizontal sync signal HSOUT.

Figure 1B:
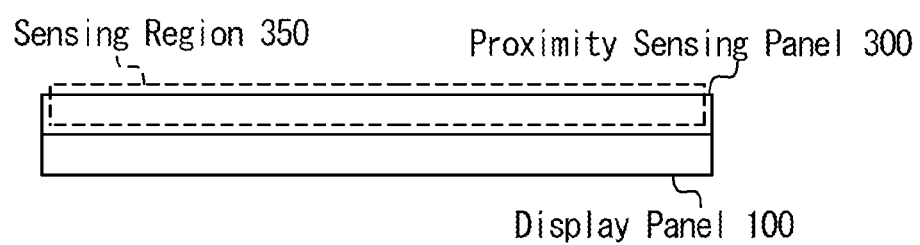
FIG. 1B shows an example side view of a display panel and a proximity sensing panel, according to one or more embodiments.

FIG. 1B shows an example side view of the display panel 100 and the proximity sensing panel 300, according to one or more embodiments. In the shown embodiment, the display panel 100 defines a sensing region 350 in which the proximity sensing controller 400 is configured to detect one or more input objects. In the shown embodiment, the sensing region 350 is located near the display panel 100. The proximity sensing panel 300 is disposed on or near the display panel 100, at least partially overlapping the display panel 100 to enable sensing one or more input objects in the sensing region 350.

Figure 2A:
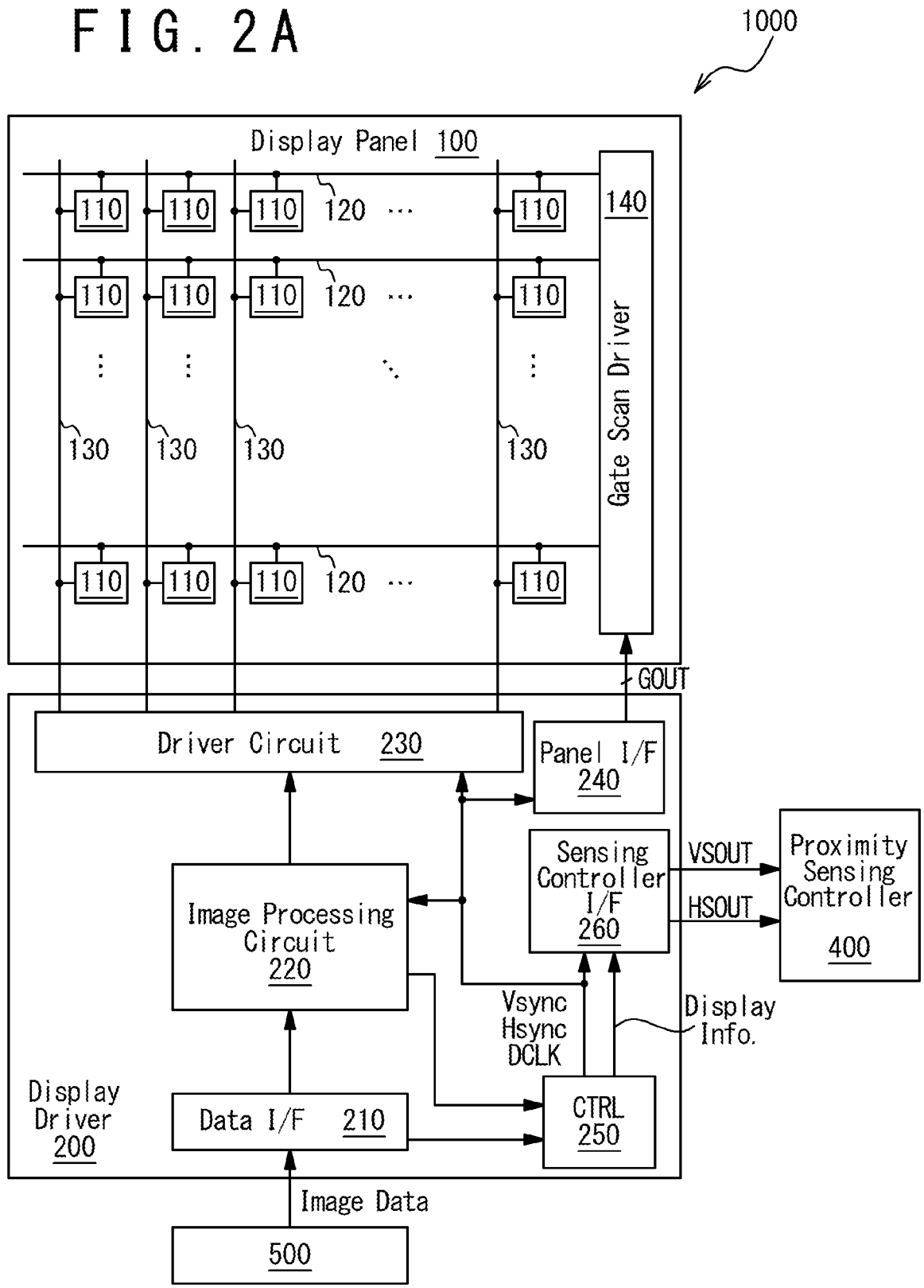
FIG. 2A shows example configurations of a display panel and a display driver, according to one or more embodiments.

FIG. 2A shows example configurations of the display panel 100 and the display driver 200, according to one or more embodiments. The display panel 100 may be any type of dynamic display capable of displaying a visual interface to a user. Examples of the display panel 100 include organic light emitting diode (OLED) display panels, micro light emitting diode (μLED) display panels and liquid crystal display (LCD) panels. In the shown embodiment, the display panel 100 includes display elements 110, gate lines 120 (also referred to as scan lines), source lines 130 (also referred to as data lines), and a gate scan driver 140. Each display element 110 may include an OLED pixel, a μLED pixel, an LCD pixel, or a different type of pixel. Each display element 110 is coupled to the corresponding gate line 120 and source line 130. It is noted that the source lines 130 each have a significant capacitance since the source lines 130 almost traverse the display panel 100 in the vertical direction. Each display element 110 of the display panel 100 is configured to be updated or programmed with a data voltage generated on the corresponding source line 130 when the gate line 120 coupled to the display element 110 is asserted.

The gate scan driver 140 is configured to scan the gate lines 120 to select a row of display elements 110 to be updated. When display elements 110 of a selected row is to be updated, the gate scan driver 140 asserts the gate line 120 coupled to the display elements 110 of the selected row. In the shown embodiment, the gate scan driver 140 is configured to be responsive to gate control signals GOUT received from the display driver 200 for scanning the gate lines 120. The gate control signals GOUT may include, but not limited to, a gate scan start pulse signal and a gate scan clock. The gate control signals GOUT may be used to control the frequency of the scanning of the gate lines 120, which may correspond to the display frame rate. The gate control signals GOUT may be further used to select gate lines 120 to be scanned. In some implementations, only part of the display panel 100 is refreshed or updated. In such cases, the gate control signals GOUT may be generated to specify the gate lines 120 to be scanned.

The display panel 100 may further include other components and signal lines depending on the display technology. In embodiments where an OLED display panel is used as the display panel 100, for example, the display panel 100 may further include emission lines that control light emission of the display elements 110, an emission scan driver configured to drive the emission lines, and/or power lines that delivers a power supply voltage to the respective display elements 110.

The display driver 200 is configured to drive the source lines 130 of the display panel 100 based on image data received from the host 500. The image data corresponds to an image to be displayed on the display panel 100. The image data may include graylevels of the respective display elements 110 of the display panel 100. The display driver 200 is configured to generate data voltages for the respective display elements 110 based on the image data received from the host 500 and provide the generated data voltages to the respective display elements 110 via the source lines 130.

In the shown embodiment, the display driver 200 includes a data interface circuit (I/F) 210, an image processing circuit 220, a driver circuit 230, a panel interface circuit 240, a control (CTRL) circuit 250, and a sensing controller interface 260. The data interface circuit 210 is configured to receive image data from the host 500 and forward the received image data to the image processing circuit 220. The image processing circuit 220 is configured to process the image data and provide the processed image data to the driver circuit 230. The processing of the image data may include, but not limited to, color adjustment, mura correction, image scaling, subpixel rendering, overshoot driving, gamma transformation, and other image processes. The driver circuit 230 is configured to drive the display panel 100 based at least in part on the processed image data. The panel interface (I/F) circuit 240 is configured to generate the gate control signals GOUT, which controls the gate scan driver 140, under the control of the control circuit 250. The panel interface circuit 240 may be further configured to generate control signals that control other components (e.g., emission lines and an emission scan driver) in the display panel 100.

The control circuit 250 is configured to provide overall control of the display driver 200. For example, the control circuit 250 may be configured to generate a vertical sync signal Vsync, a horizontal sync signal Hsync, and a dot clock DCLK to provide timing control of the image processing circuit 220, the driver circuit 230, and other circuits (not shown) in the display driver 200. The vertical sync signal Vsync defines display frame periods (or vertical sync periods) in the display driver 200, while the horizontal sync signal Hsync defines line periods (or horizontal sync periods). In some implementations, the vertical sync signal Vsync may be asserted at the beginning of each display frame period, and the horizontal sync period Hsync may be asserted at the beginning of each line period.

The control circuit 250 may be further configured to control the display frame rate. The display frame rate may be the number of frame images displayed per unit time, which may correspond to the frequency of refreshing or updating the display panel per unit time. In various implementations, the control circuit 250 may be configured to adjust the display frame rate by adjusting the frequency of the scanning of the gate lines 120 via the panel interface circuit 240, which generates the gate control signals GOUT. The control circuit 250 may be configured to select the display frame rate from among a plurality of display frame rates (e.g., 24 Hz, 30 Hz, 60 Hz, and 120 Hz). The adjustment of the display frame rate may be responsive to instructions received from the host 500.

The control circuit 250 may be further configured to control the frequency of the vertical sync signal Vsync and/or the frequency of the horizontal sync signal Hsync. The vertical sync signal Vsync may be adjusted in accordance with the display frame rate. In embodiments where the vertical sync signal Vsync is generated by counting assertions of the horizontal sync signal Hsync, the control circuit 250 may be configured to adjust the frequency of the vertical sync signal Vsync controlled by adjusting the frequency of the horizontal sync signal Hsync.

The control circuit 250 may be further configured to control the display mode of the display driver 200. In some embodiments, the display driver 200 is configured to have a plurality of display modes, including, but not limited to, a game mode, a normal mode, a low power display mode, and a movie mode. In one or more embodiments, the display frame rate may vary depending on the display mode. For example, the control circuit 250 may be configured to adjust the display frame rate to a nominal display frame rate (e.g., 60 Hz) in the normal mode while adjusting the display frame rate to a higher display frame rate (e.g., 120 Hz) in the game mode. The control circuit 250 may be configured to adjust the display frame rate to a lower display frame rate (e.g., 30 Hz) in the low power display mode and to a further lower display frame rate (e.g., 24 Hz) in the movie mode.

In various embodiments, the control circuit 250 is configured to generate display information that indicates how the display panel 100 is driven or updated. The driver circuit 230 is configured to drive the display panel 100 according to the display information while the panel interface circuit 240 is configured to generate the gate control signals GOUT according to the display information. The display information may be based on at least one of the display frame rate (or the display refresh rate), the frequency of the horizontal sync signal Hsync, and the display mode. In some embodiments, the display information may be generated to indicate at least one of the display frame rate, the frequency of the horizontal sync signal Hsync, and the display mode.

The control circuit 250 may be configured to generate the display information based at least in part on the image data received from the host 500. In some embodiments, the image processing circuit 220 may be configured to detect one or more predetermined patterns in the image to be displayed on the display panel 100 based on the image data and inform the control circuit 250 of the detection of the one or more predetermined pattern. The control circuit 250 may be configured to generate the display information to indicate the detection of the one or more predetermined patterns.

Figure 2B:
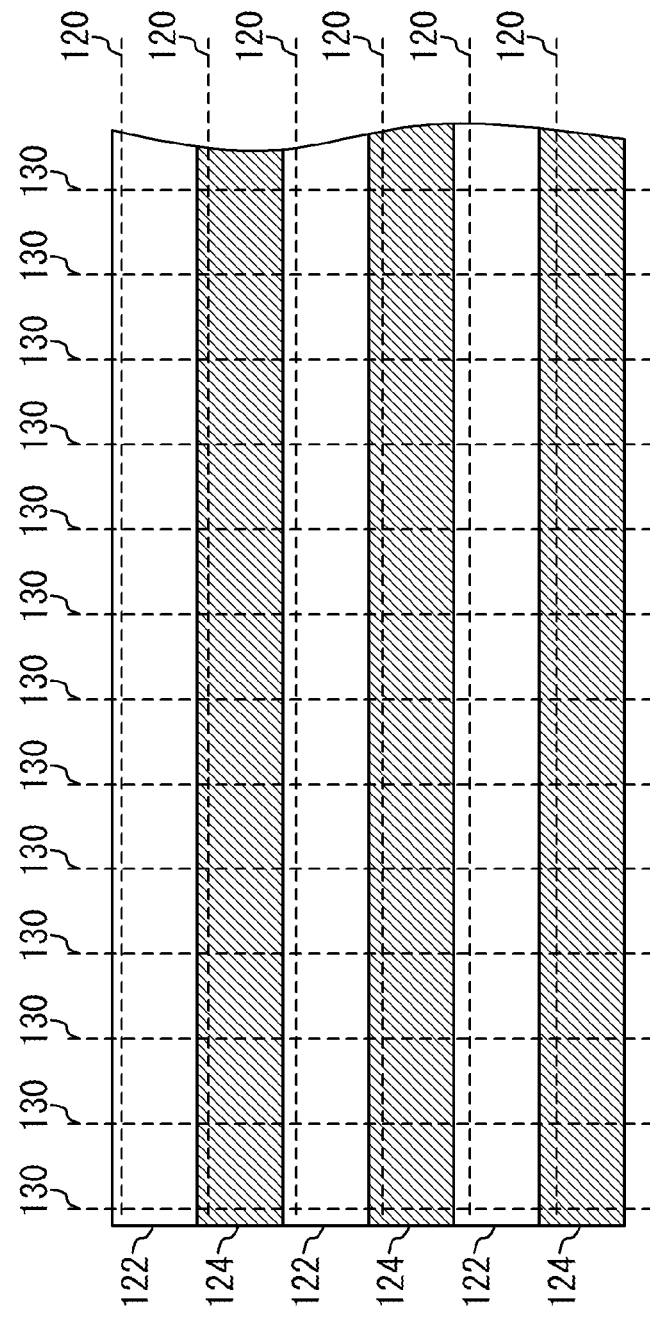
FIG. 2B shows an example "horizontal strip pattern", according to one or more embodiments.

In some embodiments, the one or more predetermined patterns to be detected may include a "horizontal stripe pattern." FIG. 2B shows an example "horizontal stripe pattern", according to one or more embodiments. In the shown embodiment, the horizontal stripe pattern referred herein may include one or more bright stripes 122 and one or more dark stripes 124, both extending in the "horizontal" direction (i.e., the direction in which the gate lines 120 extend) and alternately arranged in the "vertical" direction (i.e., the direction in which the source lines 130 extend). The horizontal stripe pattern in the displayed image may generate large changes in the voltage levels on the source lines 130, undesirably increasing electromagnetic interference onto the proximity sensing panel 300 due to the capacitive coupling between the source lines 130 and sensor electrodes disposed in the proximity sensing panel 300. In FIG. 2B, relevant gate lines 120 and source lines 130 are also shown in phantom while display elements coupled to the gate lines 120 and source lines 130 are not shown for simplicity. In the shown embodiment, each bright stripe 122 corresponds to a row of display elements for which a first graylevel is specified while each dark stripe 124 corresponds to a row of display elements for which a second graylevel lower than the first graylevel is specified. A "row" of display elements referred herein are display elements coupled to the same gate line 120. In some embodiments, the first graylevel may be the maximum graylevel and the second graylevel may be the minimum graylevel. In embodiments where each bright stripe 122 corresponds to a row of display elements with the maximum graylevel and each dark stripe 124 corresponds to a row of display elements with the minimum graylevel is specified, possible largest changes occur in the data voltages generated on the source lines 130.

Referring back to FIG. 2A, the sensing controller interface 260 is configured to generate and provide the output vertical sync signal VSOUT and the output horizontal sync signal HSOUT to the proximity sensing controller 400. The output vertical sync signal VSOUT is synchronous with the vertical sync signal Vsync to inform the proximity sensing controller 400 of the beginning of each display frame period (or each vertical sync period). The output vertical sync signal VSOUT may be asserted in response to assertions of the vertical sync signal Vsync. Correspondingly, the output horizontal sync signal HSOUT is synchronous with the horizontal sync signal Hsync to inform the proximity sensing controller 400 of the beginning of each line period (or each horizontal sync period). The output horizontal sync signal HSOUT may be asserted in response to assertions of the horizontal sync signal Hsync.

The sensing controller interface 260 is further configured to receive the display information from the control circuit 250 and encode the display information into the output vertical sync signal VSOUT to be transmitted to the proximity sensing controller 400. The proximity sensing controller 400 is configured to retrieve the display information from the output vertical sync signal VSOUT and adjust the proximity sensing based on the retrieved display information to detect an input object. For example, the proximity sensing controller 400 may be configured to adjust the proximity sensing frequency and/or the proximity sensing report rate based on the retrieved display information. Details of the encoding of the display information into the output vertical sync signal VSOUT and the adjustment of the proximity sensing will be described later in detail.

Figure 3:
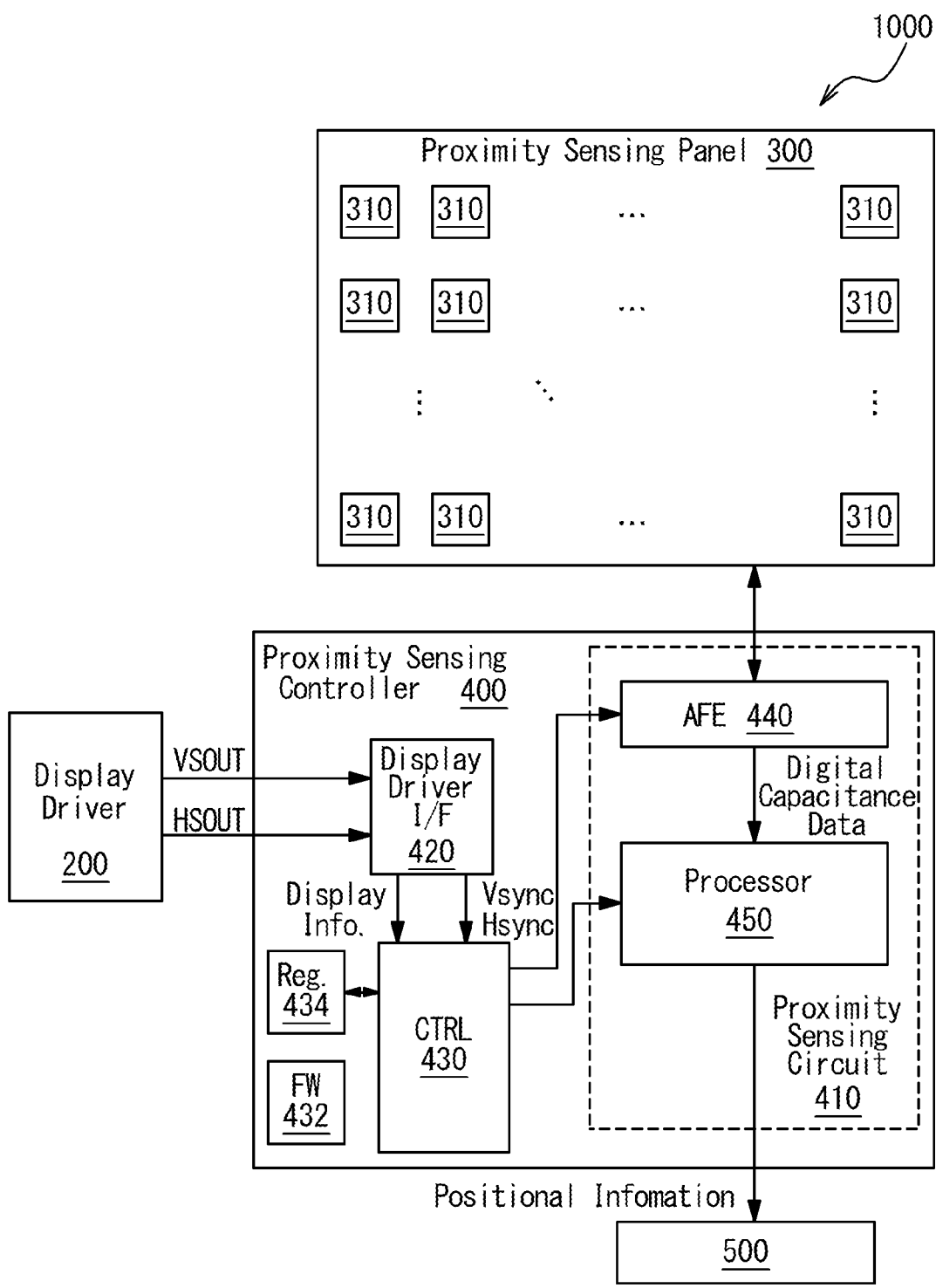
FIG. 3 shows example configurations of a proximity sensing panel and a proximity sensing controller, according to one or more embodiments.

FIG. 3 shows example configurations of the proximity sensing panel 300 and the proximity sensing controller 400, according to one or more embodiments. In the shown embodiment, the proximity sensing panel 300 includes an array of sensor electrodes 310 disposed in the sensing region 350, which is defined by the display panel 100 (as shown in FIG. 1B). The sensor electrodes 310 are used for the proximity sensing to detect one or more input objects in the sensing region 350. While nine sensor electrodes 310 are shown in FIG. 3, those skilled in the art would appreciate the proximity sensing panel 300 may include more or less than nine sensor electrodes 310. Further, while FIG. 3 shows the sensor electrodes 310 are rectangular, the sensor electrodes 310 may be shaped in a different shape, such as triangular, square, rhombic, hexagonal, or other suitable shapes.

In other embodiments, sensor electrodes for the proximity sensing may be integrated in a display panel 100. In one implementation, the sensor electrodes may be disposed on an encapsulation layer of the display panel 100. In embodiments where the display panel 100 is an LCD panel that comprises an array of common electrodes (or counter electrodes) on which a common voltage (often referred to as $V_{COM}$) is generated, the common electrodes may be used as the sensor electrodes.

The proximity sensing controller 400 includes a proximity sensing circuit 410, a display driver interface (I/F) 420, and a control circuit 430. The proximity sensing circuit 410 is configured to sense one or more input objects based on resulting signals received from the sensor electrodes 310 and generate positional information of the one or more sensed input objects. "Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time. The generated positional information is sent to the host 500.

In one or more embodiments, the proximity sensing circuit 410 is configured to sense one or more input objects through capacitive proximity sensing. Some capacitive proximity sensing implementations utilize "absolute capacitance" (also often referred to as "self-capacitance") sensing methods based on changes in the capacitive coupling between the sensor electrodes 310 and an input object. In various embodiments, an input object near the sensor electrodes 310 alters the electric field near the sensor electrodes 310, thus changing the capacitive coupling. The resulting signals acquired from the sensor electrodes 310 include effects of the changes in the capacitive coupling. In some implementations, an absolute capacitance sensing method may operate by modulating the sensor electrodes 310 with respect to a reference voltage, e.g., system ground, and by detecting the capacitive coupling between the sensor electrodes 310 and input objects. In such implementations, the proximity sensing frequency may correspond to the modulation frequency of the sensor electrodes 310.

Some capacitive proximity sensing implementations utilize "transcapacitance" (also often referred to as "mutual capacitance") sensing methods based on changes in the capacitive coupling between transmitter electrodes (not shown) and the sensor electrodes 310, which are used as receiver electrodes. In various embodiments, an input object near the sensor electrodes 310 alters the electric field between the transmitter electrodes and the sensor electrodes 310, thus changing the capacitive coupling. In one implementation, a transcapacitance sensing method operates by detecting the capacitive coupling between one or more transmitter electrodes and one or more sensor electrodes 310. The coupling may be reduced when an input object coupled to a system ground approaches the sensor electrodes 310. Transmitter electrodes may be modulated relative to a reference voltage, e.g., system ground. In such embodiments, the proximity sensing frequency may correspond to the modulation frequency of the transmitter electrodes. The sensor electrodes 310 may be held substantially constant relative to the reference voltage or modulated relative to the transmitter electrodes to facilitate receipt of resulting signals.

In the shown embodiment, the proximity sensing circuit 410 includes an analog front end (AFE) 440, and a processor 450. The AFE 440 is configured to receive the resulting signals from the sensor electrodes 310 and process the resulting signals to generate digital capacitance data. The digital capacitance data includes information of the capacitances of the sensor electrodes 310. The processing of the resulting signals may include analog signal filtering and analog-to-digital conversion. In embodiments where an absolute capacitance sensing method is used for the proximity sensing, the AFE 440 may be further configured to provide sensing signals to the sensor electrodes 310. In some embodiments, the sensing signals may be constant voltage signals. In other embodiments, the sensing signals may be voltage signals modulated with respect to the system ground. The sensing voltages may be periodical voltage signals such as sinusoidal voltages, triangular wave voltages, and trapezoidal wave voltages. In embodiments where a transcapacitance sensing method is used for the proximity sensing, the AFE 440 may be further configured to provide sensing signals to transmitter electrodes.

The processor 450 is configured to process the digital capacitance data to generate the positional information of the one or more sensed input objects. Examples of the processor 450 include a micro controller unit (MCU), a central processing unit (CPU), and other processors configured to process the digital capacitance data to generate the positional information. The processor 450 is further configured to provide the positional information to the host 500. The host 500 may be configured to generate, based on the positional information of the input object, image data corresponding to a user interface image to be displayed on the display panel 100.

The processing of the digital capacitance data may include noise filtering configured to mitigate or filter out noise caused by electromagnetic interference onto the sensor electrodes 310. The capacitive coupling between the source lines 130 and the sensor electrodes 310 may cause electromagnetic interference onto the sensor electrodes 310 when the display driver 200 drives the source lines 130 during update of the display panel 100. The electromagnetic interference may depend on the image data, that is, the image displayed on the display panel 100. The electromagnetic interference may become severe especially when the displayed image includes a horizontal stripe pattern, since the horizontal stripe pattern cause large changes in the voltage levels on the source lines 130 as described in relation to FIG. 2B. The processor 450 may be configured to adaptively apply noise filtering to the digital capacitance data to mitigate the effect of the electromagnetic interference onto the sensor electrodes 310 in response to detection of the horizontal stripe pattern. The digital filtering may be firmware (FW)-based filtering achieved by causing the processor 450 to execute codes contained in firmware 432.

The display driver interface circuit 420 is configured to receive the output vertical sync signal VSOUT and the output horizontal sync signal HSOUT to reproduce the vertical sync signal Vsync and the horizontal sync signal Hsync from the output vertical sync signal VSOUT and the output horizontal sync signal HSOUT, respectively. The display driver interface circuit 420 is further configured to provide the reproduced vertical sync signal Vsync and the reproduced horizontal sync signal Hsync to the control circuit 430. The display driver interface circuit 420 is further configured to retrieve the display information encoded in the output vertical sync signal VSOUT and provide the retrieved display information to the control circuit 430. The control circuit 430 may be configured to store the display information in a register circuit 434.

The control circuit 430 is further configured to control the operation of the proximity sensing circuit 410 based at least in part on the display information to adjust the proximity sensing performed by the proximity sensing circuit 410. Examples of the control of the operation of the proximity sensing circuit 410 may include adjustment of the proximity sensing report rate, adjustment of the proximity sensing frequency, and/or instruction to apply the noise filtering to the digital capacitance data. In embodiments where an absolute capacitance sensing method is used, the proximity sensing frequency may correspond to the frequency of sensing signals applied to the sensor electrodes 310. In embodiments where a transcapacitance sensing method is used, the proximity sensing frequency may correspond to the frequency of transmitter signals applied to transmitter electrodes (not shown).

The present disclosure recognizes that encoding the display information into the output vertical sync signal VSOUT effectively reduces hardware used to adjust the proximity sensing depending on one or more image displaying settings. The one or more image displaying settings referred herein may include the display frame rate, the frequency of the horizontal sync signal Hsync, the display mode, inclusion of a predetermined pattern (e.g., a horizontal stripe pattern) in the image to be displayed. The architecture that encodes the display information in the output vertical sync signal VSOUT eliminates the need of providing an additional signal line to transmit the display information from the display driver 200 to the proximity sensing controller 400, reducing the hardware.

Figure 4:
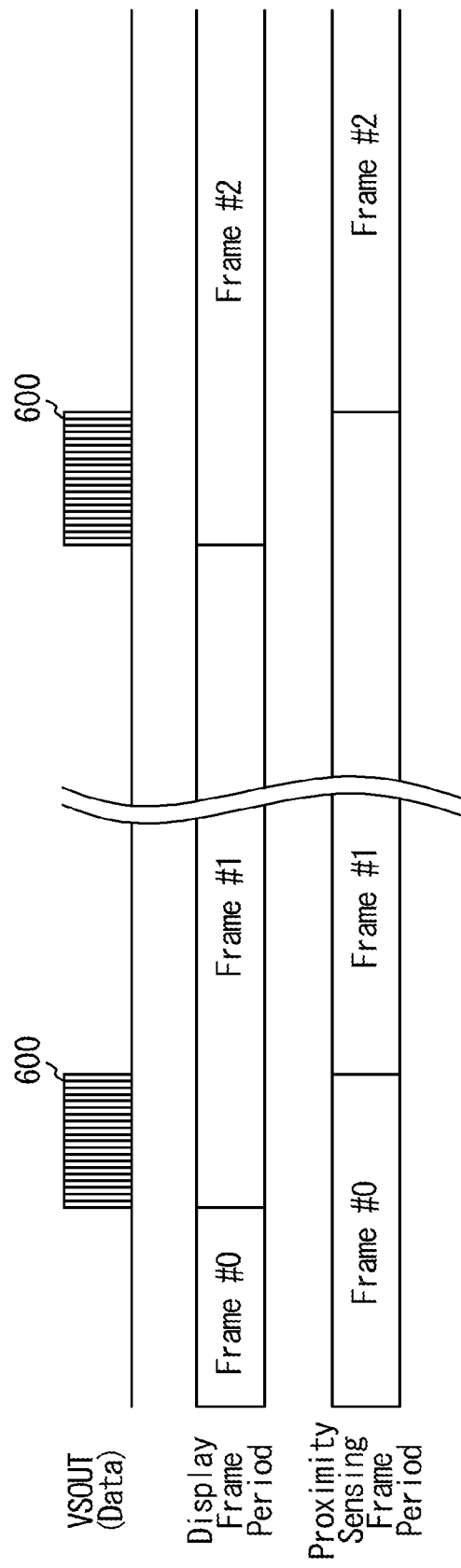
FIG. 4 shows example encoding of display information into an output vertical sync signal, according to one or more embodiments.

FIG. 4 shows example encoding of the display information into the output vertical sync signal VSOUT, according to one or more embodiments. In the shown embodiment, the display information is encoded in the form of a pulse train 600 that appears on the output vertical sync signal VSOUT at the beginning of each display frame period. In FIG. 4, two pulse trains 600 are shown which indicate the starts of the display frame periods #1 and #2. The timing of the appearance of the pulse train 600 is synchronous with an assertion of the vertical sync signal Vsync generated in the display driver 200.

Figure 5:
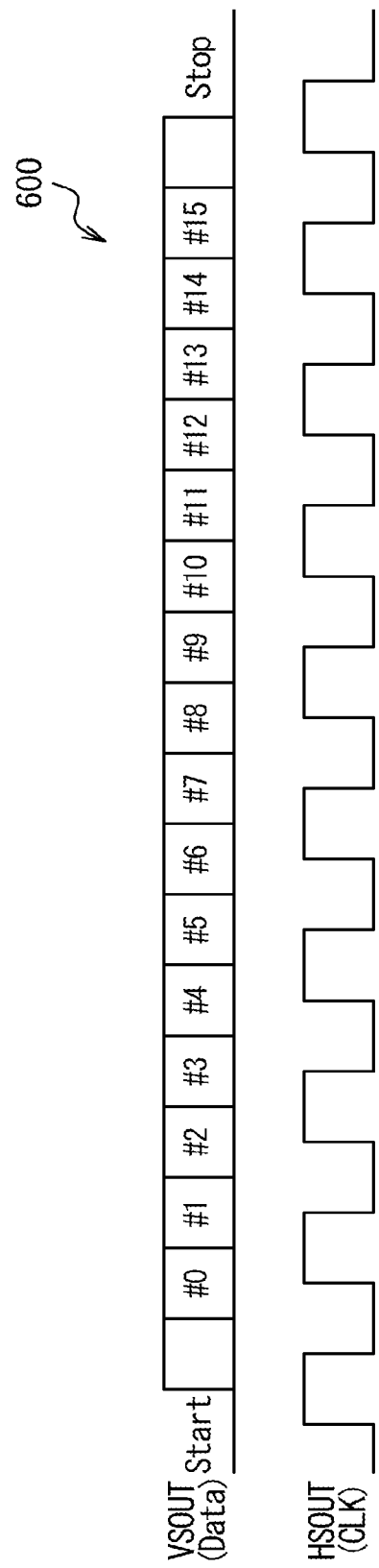
FIG. 5 shows an example pulse train of an output vertical sync signal, according to one or more embodiments.

FIG. 5 shows an example pulse train 600 of the output vertical sync signal VSOUT, according to one or more embodiments. The output vertical sync signal VSOUT is first asserted (in FIG. 5, pulled up to the high level) to indicate the start of the corresponding display frame period and then modulated to encode the display information in the form of the pulse train 600. The pulse train 600 incorporates one or more data digits of the display information. In the embodiment shown in FIG. 5, the pulse train 600 incorporates 16 data digits #0 to #15. It is noted that the number of data digits in the pulse train 600 may be less or more than 16. Each data digit may be the represented by the voltage level of the output vertical sync signal VSOUT.

In some embodiments, the sensing controller interface 260 of the display driver 200 (shown in FIG. 2A) is configured to generate the output vertical sync signal VSOUT such that the data digits of the display information appear on the output vertical sync signal VSOUT in synchronization with the output horizontal sync signal HSOUT. In the shown embodiment, each data digit is synchronous with a leading or trailing pulse edge of the output horizontal sync signal HSOUT. In such embodiments, the display driver interface circuit 420 of the proximity sensing controller 400 (shown in FIG. 3) may be configured to latch the data digits in synchronization with the output horizontal sync signal HSOUT, using the output horizontal sync signal HSOUT as a latching clock signal. In one implementation, the display driver interface circuit 420 may be configured to latch the data digits in synchronization of the leading and trailing pulse edges of the output horizontal sync signal HSOUT.

FIGS. 6A and 6B show example encoding of the display information into the output vertical sync signal VSOUT, according to other embodiments. In the shown embodiment, the display information is encoded in the form of the pulse width of a pulse that appears on the output vertical sync signal VSOUT. FIG. 6A shows a pulse with a pulse width $W_1$ while FIG. 6B shows a pulse with a pulse width $W_2$. The sensing controller interface 260 of the display driver 200 (shown in FIG. 2A) may be configured to adjust the pulse width of a pulse of the output vertical sync signal VSOUT based on the display information to be encoded, while the display driver interface circuit 420 of the proximity sensing controller 400 (shown in FIG. 3) is configured to determine the pulse width and retrieve the display information based on the determined pulse width.

In the following, a description is given of details of control or adjustment of the proximity sensing based on the display information encoded in the output vertical sync signal VSOUT.

In one or more embodiments, the display information may be generated to indicate detection of a predetermined pattern in the image to be displayed. One example of the predetermined pattern to be detected may be a "horizontal stripe pattern" as described in relation to FIG. 2B. In such embodiments, the control circuit 430 may be configured to adjust the proximity sensing frequency in response to the detection of the predetermined pattern. In embodiments where an absolute capacitance sensing method is used, the proximity sensing frequency may correspond to the frequency of sensing signals applied to the sensor electrodes 310. In embodiments where a transcapacitance sensing method is used, the proximity sensing frequency may correspond to the frequency of transmitter signals applied to transmitter electrodes (not shown).

The proximity sensing frequency may be adjusted to mitigate the effect of electromagnetic interference onto the sensor electrodes 310 during updating the display panel 100. Displaying an image with the predetermined pattern (e.g., the horizontal stripe pattern shown in FIG. 2B) may generate electromagnetic interference at a certain frequency or in a certain frequency band. In one implementation, the proximity sensing frequency may be adjusted to a frequency different from the frequency at which electromagnetic interference occurs or to a frequency out of the frequency band in which electromagnetic interference occurs.

Additionally, or alternatively, the control circuit 430 may be configured to instruct the processor 450 to apply noise filtering to the digital capacitance data in response to the detection of the predetermined pattern. The noise filtering may be performed to mitigate or filter out noise caused by the electromagnetic interference onto the sensor electrodes 310. The noise filtering may be FW-based noise filtering, which may be achieved by executing codes contained in the firmware 432.

In other embodiments, the control circuit 430 may be configured to determine whether the electromagnetic interference can be sufficiently reduced by adjusting the proximity sensing frequency. The control circuit 430 may be further configured to adjust the proximity sensing frequency when determining that the electromagnetic interference can be sufficiently reduced by the adjustment of the proximity sensing frequency. The control circuit 430 may be further configured to instruct the processor 450 to apply noise filtering to the digital capacitance data when determining that the electromagnetic interference cannot be sufficiently reduced by adjusting the proximity sensing frequency.

In one or more embodiments, the display information may be generated to indicate the frequency of the horizontal sync signal Hsync. In such embodiments, the control circuit 430 may be configured to adjust the proximity sensing frequency based on the frequency of the horizontal sync signal Hsync. Updating the display panel 100 may generate electromagnetic interference onto the sensor electrodes 310 at the frequency of the horizontal sync signal Hsync or in a frequency band around the frequency of the horizontal sync signal Hsync. In one implementation, the proximity sensing frequency may be adjusted to a frequency sufficiently largely different from the horizontal sync signal Hsync.

Additionally, or alternatively, the control circuit 430 may be configured to instruct the processor 450 to apply noise filtering to the digital capacitance data based on the frequency of the horizontal sync signal Hsync. The noise filtering may be performed to mitigate or filter out noise caused by the electromagnetic interference onto the sensor electrodes 310. The noise filtering may be FW-based noise filtering, which may be achieved by executing codes contained in the firmware 432.

In other embodiments, the control circuit 430 may be configured to determine whether the electromagnetic interference at the frequency of the horizontal sync signal Hsync or in a frequency band around the frequency of the horizontal sync signal Hsync can be sufficiently reduced by adjusting the proximity sensing frequency. The control circuit 430 may be further configured to adjust the proximity sensing frequency when determining that the electromagnetic interference can be sufficiently reduced by the adjustment of the proximity sensing frequency. The control circuit 430 may be further configured to instruct the processor 450 to apply noise filtering to the digital capacitance data when determining that the electromagnetic interference cannot be sufficiently reduced by adjusting the proximity sensing frequency.

In one or more embodiments, the display information may be generated to indicate the display frame rate. In such embodiments, the control circuit 430 may be configured to adjust the proximity sensing report rate based on the display frame rate. Adjusting the proximity sensing report rate based on the display frame rate may allow optimization of the power consumption and/or the proximity sensing latency. In some embodiments, the proximity sensing report rate may be adjusted such that the proximity sensing report rate increases as the display frame rate increases. In one implementation, the proximity sensing report rate may be adjusted to 240 Hz for a display frame rate of 120 Hz (which may be suitable for gaming), to 120 Hz for a display frame rate of 60 Hz (which may be a nominal display frame rate), to 60 Hz for a display frame rate of 30 Hz (which may be used for low power operation), and to 48 Hz for a display frame rate of 24 Hz (which may be suitable for playing a movie).

In one or more embodiments, the display information may be generated to indicate the display mode of the display driver 200. In such embodiments, the control circuit 430 may be configured to adjust the proximity sensing report rate based on the display mode. Adjusting the proximity sensing report rate based on the display mode may allow optimization of the power consumption and/or the proximity sensing latency. In some embodiments, display modes of the display driver 200 may include at least two of a game mode, a normal mode, a low power mode, and a movie mode. The normal mode may be a display mode in which the display frame rate is a nominal display frame rate (e.g., 60 Hz). The game mode may be a display mode suitable for gaming. The display frame rate may be set higher than the nominal display frame rate (e.g., to 120 Hz) in the game mode. The low power mode may be a display mode in which power consumption is reduced. The display frame rate may be set lower than the nominal display frame rate (e.g., to 30 Hz) in the low power mode. The movie mode may be a display mode suitable for playing a movie. The display frame rate may be set suitable for playing a movie (e.g., to 24 Hz) in the movie mode. In some embodiments, the proximity sensing report rate may be adjusted such that the proximity sensing report rate increases as the display frame rate increases. In one implementation, the proximity sensing report rate may be adjusted to 240 Hz in the game mode, to 120 Hz in the normal mode, to 60 Hz in the low power mode, and to 48 Hz in the movie mode.

Figure 7:
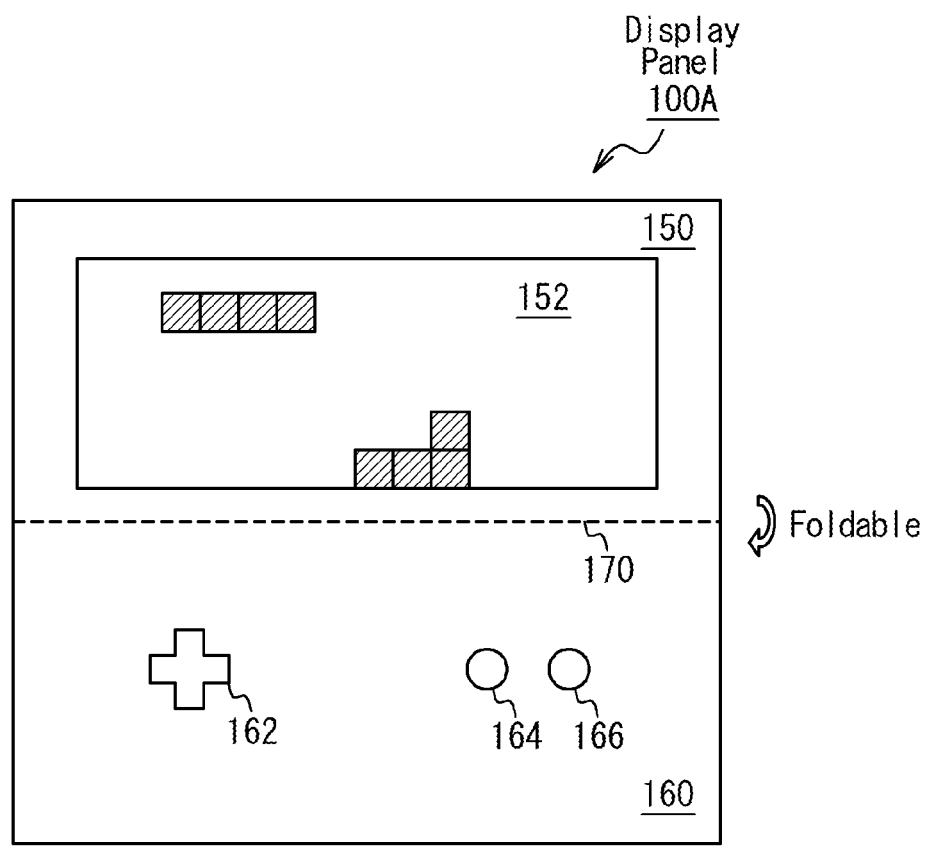
FIG. 7 shows an example configuration of a display panel, according to one or more embodiments.

FIG. 7 shows another example configuration of the display panel, denoted by numeral 100A, according to one or more embodiments. In the shown embodiment, the display panel 100A includes an upper display area (or a first display area) 150 and a lower display area (or a second display area) 160. The display panel 100A is configured to be foldable at the boundary 170 between the upper display area 150 and the lower display area 160. In some embodiments, the angle between the upper display area 150 and the lower display area 160 may be adjustable.

In embodiments where the display panel 100A shown in FIG. 7 is used, the display modes of the display driver 200 may include a two-area mode in which the upper display area 150 and the lower display area 160 are differently controlled. In the two-area mode, the upper display area 150 may be mainly used to present main contents (e.g., moving images) to the user while the lower display area 160 may be mainly used to display a user interface image for accepting user inputs. In the embodiment shown in FIG. 7, a gaming image 152 is displayed in the upper display area 150 while user interface icons, which may include a D-pad icon 162 and buttons 164 and 166, are displayed in the lower display area 160. The display driver 200 may be configured to, in the two-area mode, update the upper display area 150 and the lower display area 160 with different display refresh rates. The display refresh rate referred herein may correspond to the number of times of refresh (or update) of the image in the display area of interest per unit time. To improve user experience, in some embodiments, the display refresh rate in the upper display area 150, in which main contents may be displayed, may be higher than the display refresh rate in the lower display area 160, which may be used to display a user interface image.

Figure 8:
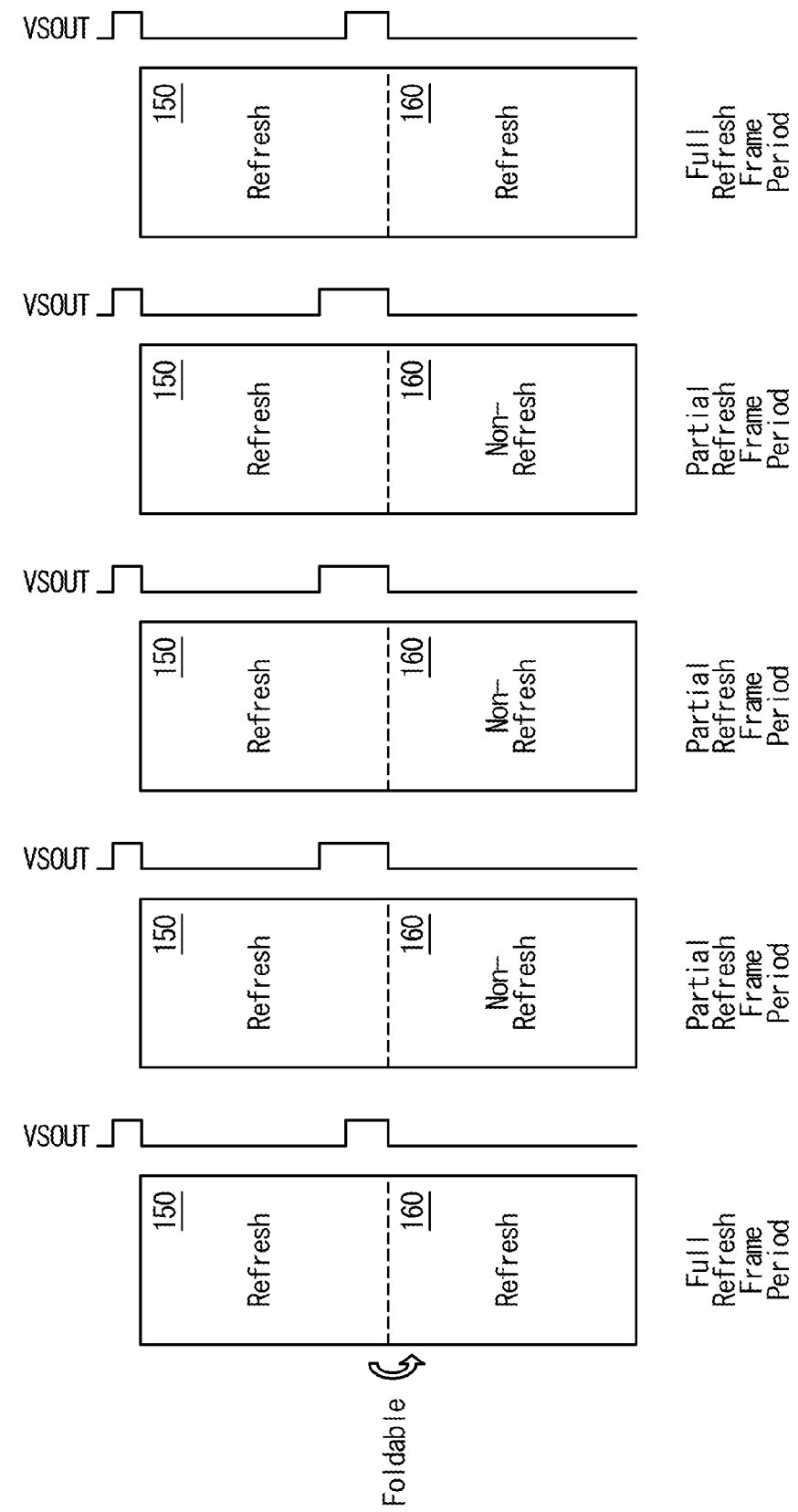
FIG. 8 shows example image displaying on a display panel in the two-area mode, according to one or more embodiments.

FIG. 8 shows example image displaying on the display panel 100A in the two-area mode, according to the embodiment shown in FIG. 7. In the shown embodiment, the upper display area 150 is refreshed or updated every frame period while the lower display area 160 is refreshed every four frame period. In some embodiments, both the upper display area 150 and the lower display area 160 (i.e., the entire display panel 100A) are refreshed in a "full refresh frame period". The full refresh frame period is followed by three "partial refresh frame periods" in which only the upper display area 150 is refreshed. The sequence of the full refresh frame period and the following three partial refresh frame periods are repeated thereafter. Accordingly, the display refresh rate of the upper display area 150 is four times as high as the display refresh rate of the lower display area 160. It is noted that the number of partial refresh frame periods that follow the full refresh frame period may be more or less than three.

In some embodiments, the proximity sensing controller 400 may be configured to adjust the proximity sensing report rate depending on the display area in the two-area mode. In some applications, the upper display area 150 is refreshed (or updated) with an increased display refresh rate suitable for displaying main contents (e.g., a gaming image), while the lower display area 160 is refreshed (or updated) with a decreased display refresh rate suitable for displaying a user interface image. In this case, the proximity sensing controller 400 may be configured to perform proximity sensing for the upper display area 150 with a reduced proximity sensing report rate to reduce power consumption reduction, since the user is unlikely to touch the upper display area 150. The proximity sensing controller 400 may be further configured to perform proximity sensing for the lower display area 160 with an increased proximity sensing report rate (which is higher than the proximity sensing report rate of the upper display area 150), since the user is expected to frequently touch the lower display area 160.

Figure 9:
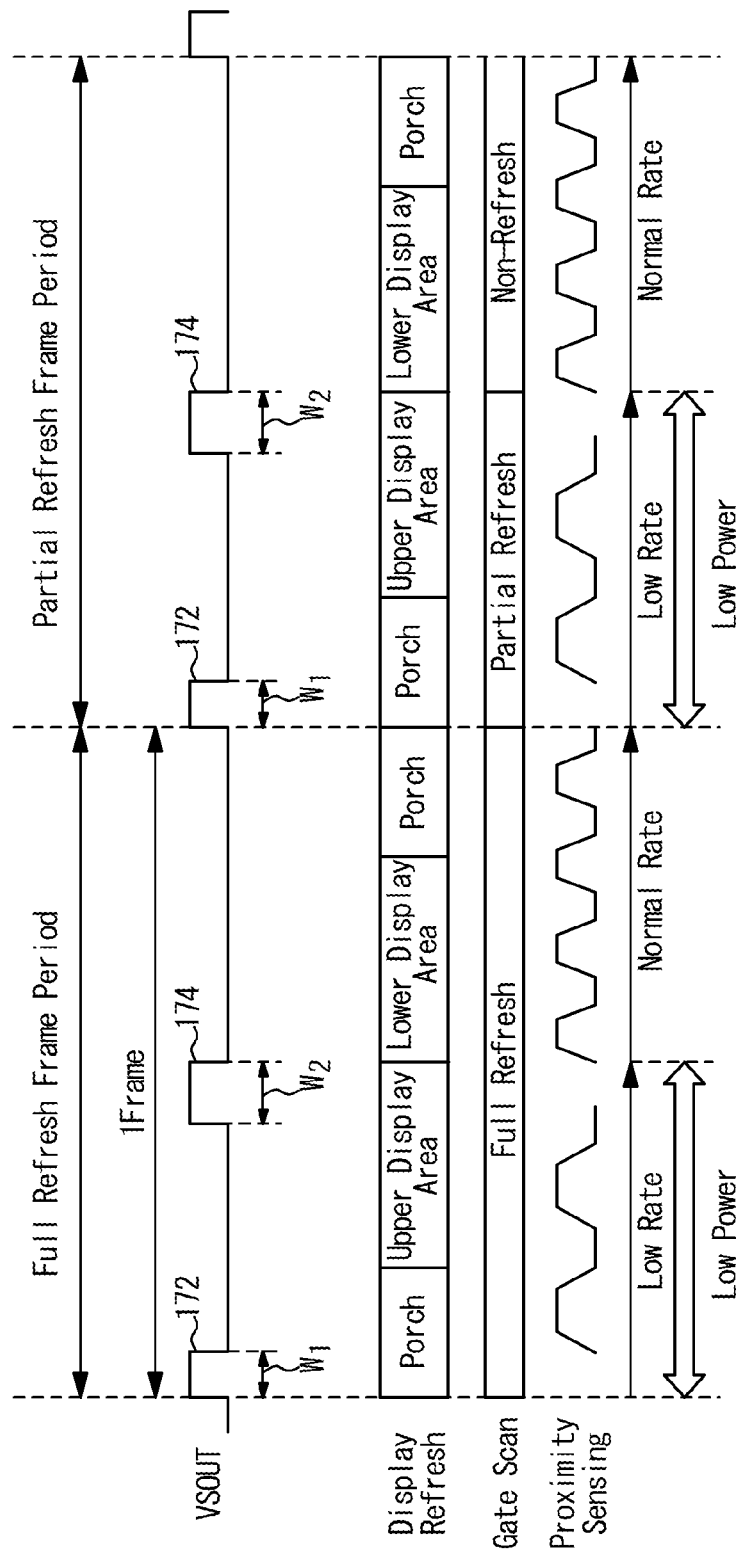
FIG. 9 shows example operations of a display driver and a proximity sensing controller, according to one or more embodiments.

FIG. 9 shows example operations of the display driver 200 and the proximity sensing controller 400 during a full refresh frame period and a partial refresh frame period, according to one or more embodiments. Both the upper display area 150 and the lower display area 160 are refreshed during the full refresh frame period. In contrast, only the upper display area 150 is refreshed during the partial refresh frame period.

In the shown embodiment, the display driver 200 is configured to generate display information that indicates the display area of interest and encode the display information into the output vertical sync signal VSOUT. In the embodiment shown in FIG. 9, the display information is encoded in the form of the pulse width of the output vertical sync signal VSOUT. In one implementation, a pulse width $W_1$ indicates that the upper display area 150 becomes of interest, and a pulse width $W_2$ indicates that the lower display area 160 becomes of interest. The proximity sensing controller 400 may be configured to determine the pulse width of each pulse that appears on the output vertical sync signal VSOUT and adjust the proximity sensing report rate based on the determined pulse width, that is, the display information that indicates the display area of interest.

In the shown embodiment, two pulses 172 and 174 appears on the output vertical sync signal VSOUT during each frame period. The pulse 172 appears at the beginning of each frame period. The pulse 172 has a pulse width $W_1$ that indicates the upper display area 150 becomes of interest. The display driver 200 refreshes or updates the upper display area 150 after the pulse 172 appears on the output vertical sync signal VSOUT. Meanwhile, the proximity sensing controller 400 adjusts the proximity sensing report rate of the upper display area 150 to a "low" rate in response to the pulse width being determined as $W_1$. The pulse 174 then appears on the output vertical sync signal VSOUT. The pulse 174 has a pulse width $W_2$ that indicates the lower display area 160 becomes of interest. The display driver 200 refreshes the lower display area 160 in the full refresh frame period and does not refresh the lower display area 160 in the partial refresh frame period. Meanwhile, the proximity sensing controller 400 adjusts the proximity sensing report rate of the lower display area 160 to a "normal" rate in response to the pulse width being determined as $W_2$. The "low" rate is lower than the "normal" rate. Adjusting the proximity sensing report rate of the upper display area 150 to the "low" rate effectively reduces the power consumption without deteriorating user experience.

Figure 10:
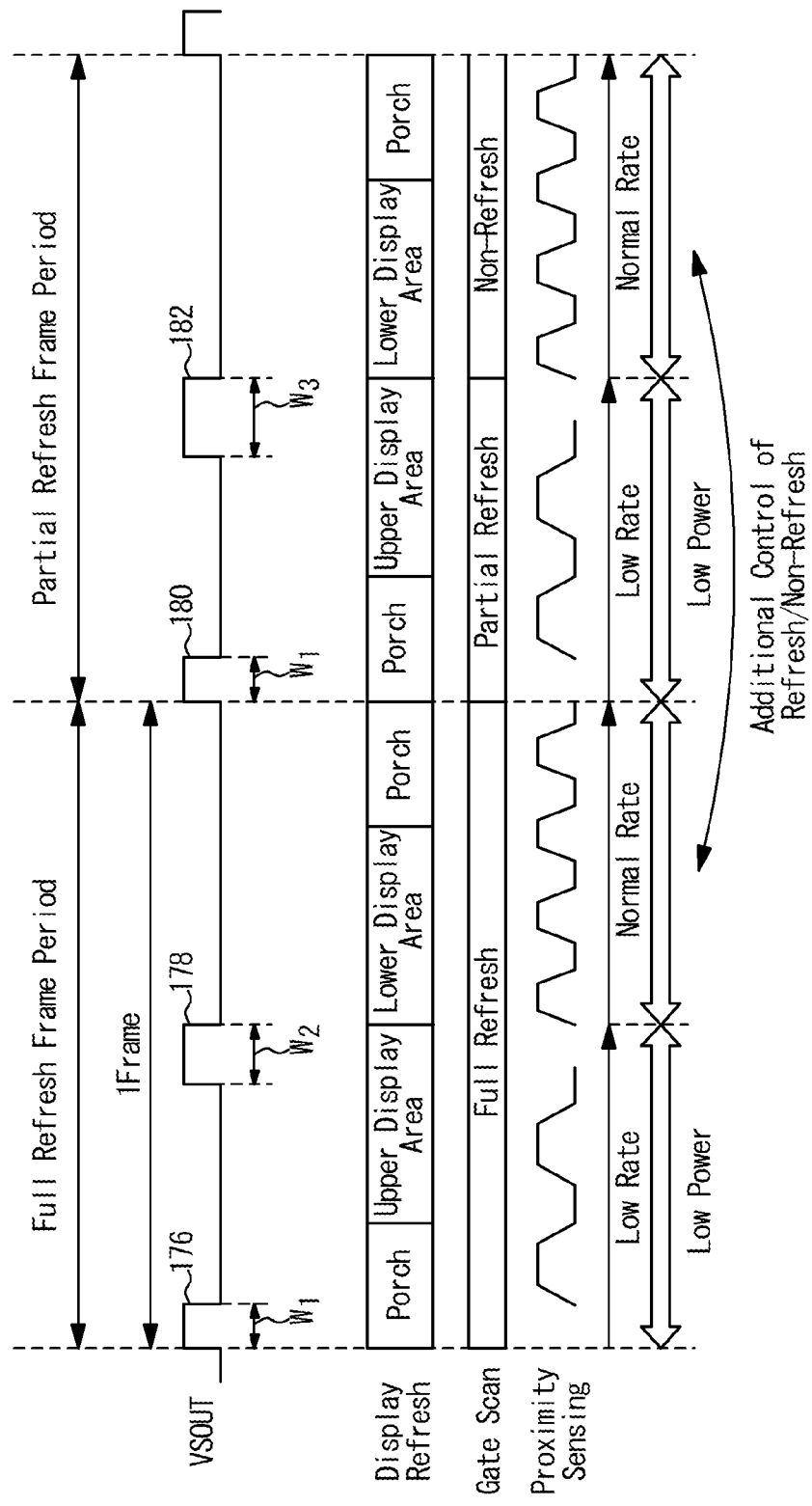
FIG. 10 shows example operations of a display driver and a proximity sensing controller, according to one or more embodiments.

FIG. 10 shows example operations of the display driver 200 and the proximity sensing controller 400 during a full refresh frame period and a partial refresh frame period, according to other embodiments. In the shown embodiment, the display information encoded in the output vertical sync signal VSOUT indicates the display area of interest and further indicates whether the display area of interest is to be refreshed. It is noted that the display information is encoded in the form of the pulse width as is the case with FIG. 9. In one implementation, a pulse width $W_1$ indicates that the upper display area 150 becomes of interest, while pulse width $W_2$ and $W_3$ indicate that the lower display area 160 becomes of interest. The pulse width $W_2$ further indicates that the lower display area 160 is to be refreshed during the current frame period, while the pulse width $W_3$ further indicates that the lower display area 160 is not to be refreshed during the current frame period.

In the shown embodiment, two pulses 176 and 178 appear on the output vertical sync signal VSOUT during the full refresh frame period. The pulse 176 appears at the beginning of the full refresh frame period. The pulse 176 has a pulse width $W_1$ that indicates the upper display area 150 becomes of interest. The display driver 200 refreshes or updates the upper display area 150 after the pulse 172 appears on the output vertical sync signal VSOUT. Meanwhile, the proximity sensing controller 400 adjusts the proximity sensing report rate of the upper display area 150 to the "low" rate in response to the pulse width being determined as $W_1$. The pulse 178 then appears on the output vertical sync signal VSOUT. The pulse 178 has a pulse width $W_2$ that indicates that the lower display area 160 is to be refreshed during the current frame period, i.e., the full refresh frame period. The display driver 200 refreshes the lower display area 160 after the pulse 178 appears. Meanwhile, the proximity sensing controller 400 adjusts the proximity sensing report rate of the lower display area 160 to the "normal" rate in response to the pulse width being determined as $W_2$.

During the partial refresh frame period, two pulses 180 and 182 appear on the output vertical sync signal VSOUT. The pulse 180 appears at the beginning of the partial refresh frame period. The pulse 180 has a pulse width $W_1$ that indicates the upper display area 150 becomes of interest. The display driver 200 refreshes or updates the upper display area 150 after the pulse 180 appears on the output vertical sync signal VSOUT. Meanwhile, the proximity sensing controller 400 adjusts the proximity sensing report rate of the upper display area 150 to the "low" rate in response to the pulse width being determined as $W_1$. The pulse 182 then appears on the output vertical sync signal VSOUT. The pulse 182 has a pulse width $W_3$ that indicates that the lower display area 160 becomes of interest but is not to be refreshed during the current frame period (i.e., the partial refresh frame period). The proximity sensing controller 400 adjusts the proximity sensing report rate of the lower display area 160 to the "normal" rate in response to the pulse width being determined as $W_3$. The operation shown in FIG. 10 allows additionally controlling execution/non-execution of refresh of the lower display area 160 for each frame period.

Figure 11:
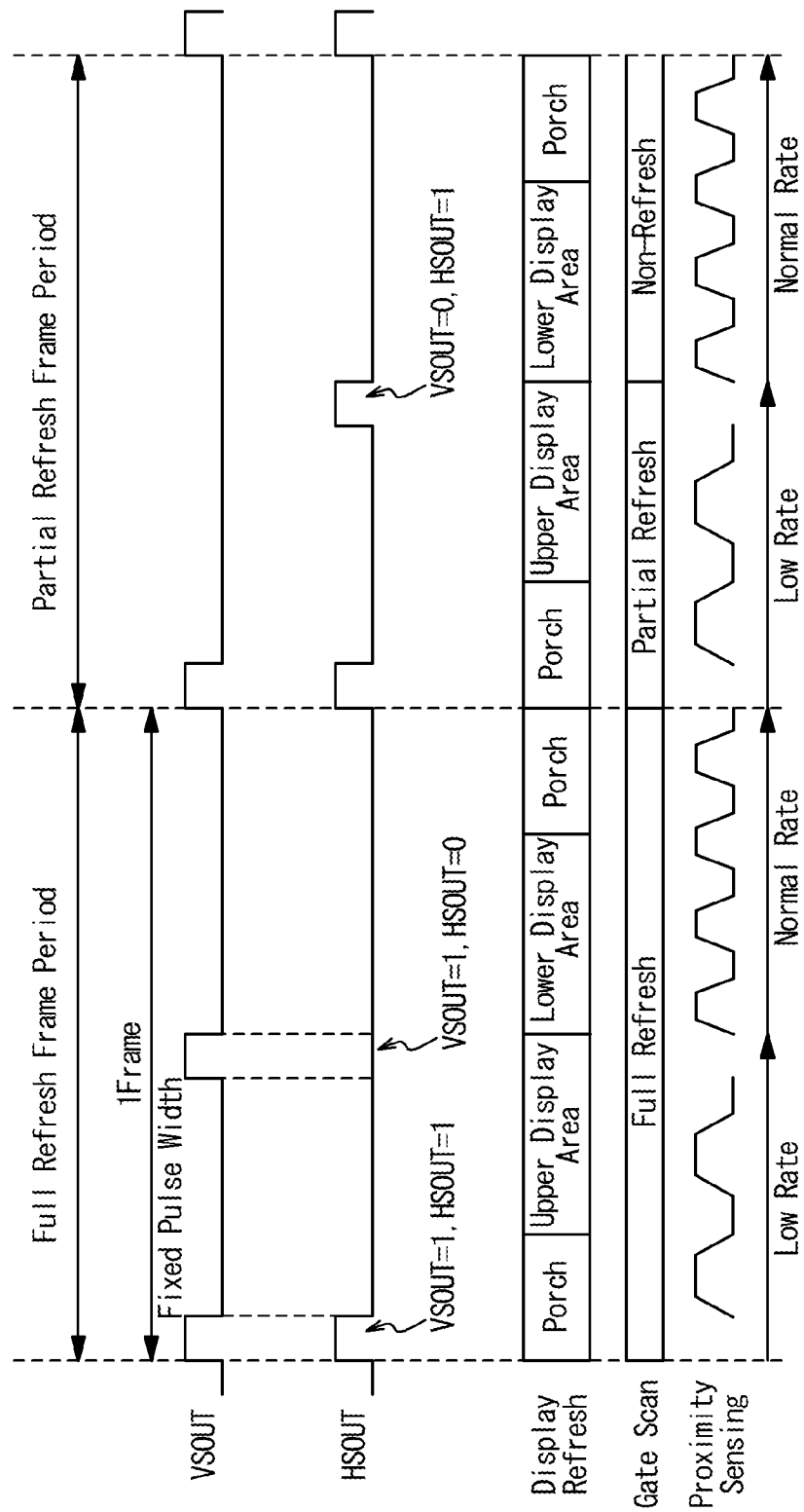
FIG. 11 shows example operations of a display driver and a proximity sensing controller, according to one or more embodiments.

FIG. 11 shows example operations of the display driver 200 and the proximity sensing controller 400 during a full refresh frame period and a partial refresh frame period, according to still other embodiments. In some embodiments, display information may be encoded into the output vertical sync signal VSOUT and the output horizontal sync signal HSOUT. In the illustrated embodiments, the display information is encoded in the form of combinations of the voltage levels (or values) of the output vertical sync signal VSOUT and the output horizontal sync signal HSOUT. The combination of the output vertical sync signal VSOUT with the high level (or a value "1") and the output horizontal sync signal HSOUT with the high level indicates that the upper display area 150 becomes of interest. The combination of the output vertical sync signal VSOUT with the high level and the output horizontal sync signal HSOUT with the low level (or a value "0") indicates that the lower display area 160 becomes of interest and to be refreshed. The combination of the output vertical sync signal VSOUT with the low level and the output horizontal sync signal HSOUT with the high level indicates that the lower display area 160 becomes of interest but not to be refreshed.

In the shown embodiment, the output vertical sync signal VSOUT and the output horizontal sync signal HSOUT are pull up to the high level for a given duration of time at the beginning of the full refresh frame period. Since the pull-ups of the output vertical sync signal VSOUT and the output horizontal sync signal HSOUT indicates that the upper display area 150 becomes of interest, the display driver 200 refreshes or updates the upper display area 150 in response to the pull-ups of the output vertical sync signal VSOUT and the output horizontal sync signal HSOUT. Meanwhile, the proximity sensing controller 400 adjusts the proximity sensing report rate of the upper display area 150 to the "low" rate in response to the output vertical sync signal VSOUT and the output horizontal sync signal HSOUT being pulled up to the high level.

Before the completion of the refresh of the upper display area 150, the output vertical sync signal VSOUT is pulled up to the high level with the output horizontal sync signal HSOUT kept at the low level. The display driver 200 refreshes the lower display area 160 after the pull-up of the output vertical sync signal VSOUT. Meanwhile, the proximity sensing controller 400 adjusts the proximity sensing report rate of the lower display area 160 to the "normal" rate in response to the output vertical sync signal VSOUT being set to the high level with the output horizontal sync signal HSOUT kept at the low level.

At the beginning of the partial refresh frame period, which follows the full refresh frame period, the output vertical sync signal VSOUT and the output horizontal sync signal HSOUT are pulled up to the high level for the given duration of time. Since the pull-ups of the output vertical sync signal VSOUT and the output horizontal sync signal HSOUT indicates that the upper display area 150 becomes of interest, the display driver 200 refreshes or updates the upper display area 150 in response to the pull-ups of the output vertical sync signal VSOUT and the output horizontal sync signal HSOUT. Meanwhile, the proximity sensing controller 400 adjusts the proximity sensing report rate of the upper display area 150 to the "low" rate in response to the output vertical sync signal VSOUT and the output horizontal sync signal HSOUT being pulled up to the high level.

Before the completion of the refresh of the upper display area 150, the output horizontal sync signal HSOUT is pulled up to the high level with the output vertical sync signal VSOUT kept at the low level. The display driver 200 does not refresh the lower display area 160 after the pull-up of the output horizontal sync signal HSOUT. Meanwhile, the proximity sensing controller 400 adjusts the proximity sensing report rate of the lower display area 160 to the "normal" rate in response to the output horizontal sync signal HSOUT being set to the high level with the output vertical sync signal VSOUT kept at the low level. The embodiment shown in FIG. 11 also allows the proximity sensing controller 400 to adjust the proximity sensing report rate depending on the display area and/or execution/non-execution of the refresh.

Figure 12:
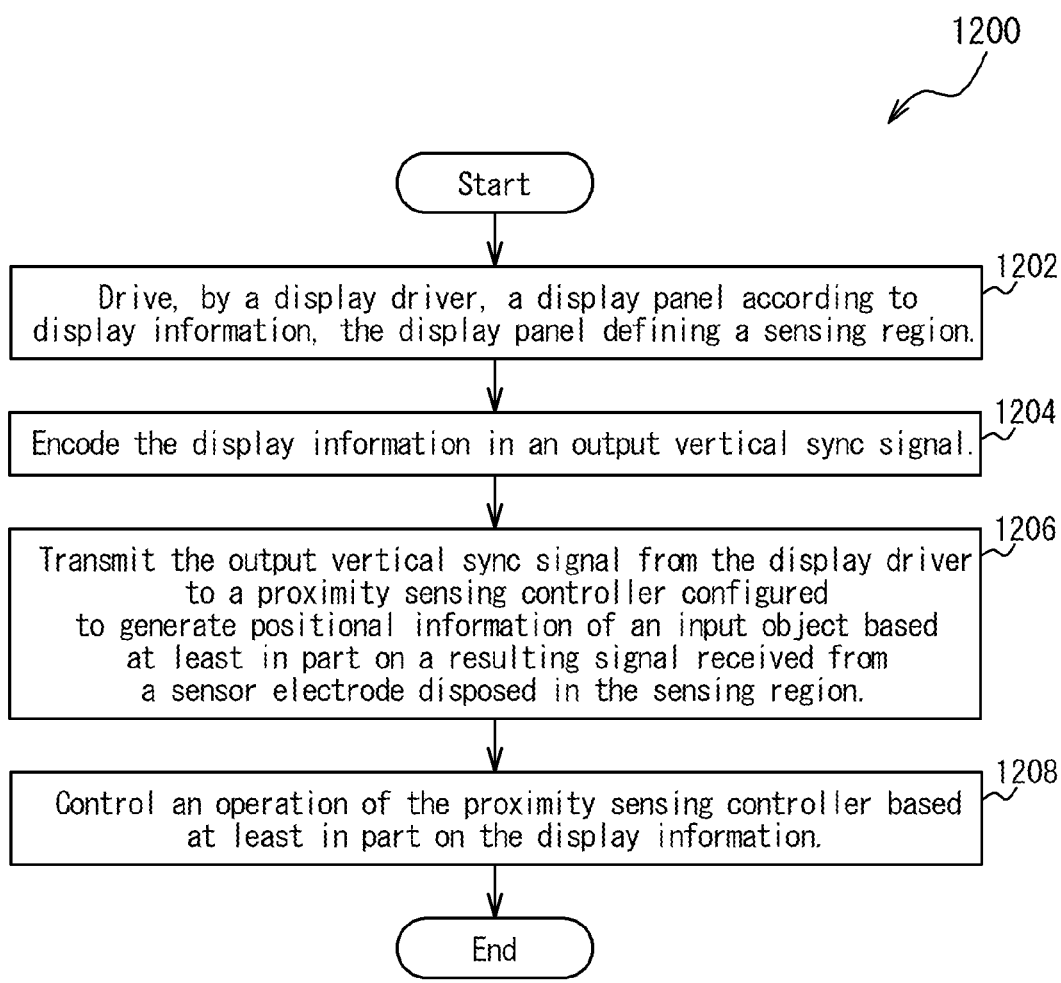
FIG. 12 shows example steps for operating an input-display device, according to one or more embodiments.

Method 1200 of FIG. 12 illustrates example steps for operating an input-display device (e.g., the input-display device shown in FIG. 1A, FIG. 2A, and FIG. 3), according to one or more embodiments. It is noted that one or more of the steps shown in FIG. 12 may be omitted, repeated, and/or performed in a different order. It is further noted that two or more steps may be implemented at the same time.

The method 1200 includes driving, by a display driver (e.g., the display driver 200 of FIGS. 1A and 2A), a display panel (e.g., the display panel 100 of FIGS. 1A, 1B, and 2A) according to display information at step 1202. The display panel defines a sensing region (e.g., the sensing region 350 of FIG. 1B). The method 1200 further includes encoding the display information in an output vertical sync signal (e.g., the output vertical sync signal VSOUT of FIGS. 1A, 2A, and 3) at step 1204. The method 1200 further includes transmitting, at step 1206, the output vertical sync signal from the display driver to a proximity sensing controller (e.g., the proximity sensing controller 400 of FIGS. 1A and 3) configured to generate positional information of an input object based at least in part on a resulting signal received from a sensor electrode (e.g., the sensor electrode 310 of FIG. 3) disposed in the sensing region. The method 1200 further includes controlling an operation of the proximity sensing controller based at least in part on the display information at step 1208.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. An input-display device, comprising:
a display driver configured to drive a display panel according to display information, the display panel defining a sensing region and including a first display area and a second display area, wherein the first display area corresponds to a first portion of the sensing region and the second display area corresponds to a second portion of the sensing region, and
wherein the first display area and the second display area are set to different frame rates based at least in part on respective contents displayed in the first and second display areas; and
a proximity sensing controller configured to:
adjust a first proximity sensing operation corresponding to the first portion of the sensing region based at least in part on first display information associated with the first display area; and
adjust a second proximity sensing operation corresponding to the second portion of the sensing region based at least in part on second display information associated with the second display area.

2. The input-display device of claim 1, wherein the first proximity sensing operation differs from the second proximity sensing operation with respect to proximity sensing frequency or proximity sensing report rate.

3. The input-display device of claim 1, wherein the display panel is configured to be foldable at a boundary between the first display area and the second display area.

4. The input-display device of claim 1, wherein the display driver is further configured to encode the display information into an output vertical sync signal.

5. The input-display device of claim 4, wherein the display driver is further configured to transmit the output vertical sync signal to the proximity sensing controller.

6. The input-display device of claim 5, wherein the proximity sensing controller is further configured to retrieve the display information from the output vertical sync signal and adjust at least one of the first proximity sensing operation or the second proximity sensing operation based at least in part on the retrieved display information to detect an input object.

7. The input-display device of claim 1, wherein the proximity sensing controller is further configured to generate positional information of an input object based at least in part on a resulting signal received from a sensor electrode disposed in the sensing region.

8. The input-display device of claim 1, wherein the display information is based at least in part on at least one of image data corresponding to an image to be displayed on the display panel, first and second display frame rates of the first and second display areas, a frequency of a horizontal sync signal, or a display mode.

9. A method for operating an input-display device, comprising:
driving, by a display driver, a display panel according to display information, the display panel defining a sensing region and including a first display area and a second display area, wherein the first display area corresponds to a first portion of the sensing region and the second display area corresponds to a second portion of the sensing region, wherein the first display area and the second display area are set to different frame rates based at least in part on respective contents displayed in the first and second display areas;
adjusting, by a proximity sensing controller, a first proximity sensing operation corresponding to the first portion of the sensing region based at least in part on first display information associated with the first display area; and
adjusting, by the proximity sensing controller, a second proximity sensing operation corresponding to the second portion of the sensing region based at least in part on second display information associated with the second display area.

10. The method of claim 9, wherein the first proximity sensing operation differs from the second proximity sensing operation with respect to proximity sensing frequency or proximity sensing report rate.

11. The method of claim 9, wherein the display panel is configured to be foldable at a boundary between the first display area and the second display area.

12. The method of claim 9, further comprising:
encoding, by the display driver, the display information into an output vertical sync signal.

13. The method of claim 12, further comprising,
transmitting, by the display driver, the output vertical sync signal to the proximity sensing controller.

14. The method of claim 13, further comprising:
retrieving, by the proximity sensing controller, the display information from the output vertical sync signal;
wherein adjusting the first proximity sensing operation and/or adjusting the second proximity sensing operation is based at least in part on the retrieved display information.

15. The method of claim 9, further comprising:
generating, by the proximity sensing controller, positional information of an input object based at least in part on a resulting signal received from a sensor electrode disposed in the sensing region.

16. The method of claim 9, wherein the display information is based at least in part on at least one of image data corresponding to an image to be displayed on the display panel, first and second display frame rates of the first and second display areas, a frequency of a horizontal sync signal, or a display mode.

17. A method, comprising:
receiving, by a proximity sensing controller, display information from a display driver configured to drive a display panel according to display information, the display panel defining a sensing region and including a first display area and a second display area, wherein the first display area corresponds to a first portion of the sensing region and the second display area corresponds to a second portion of the sensing region, wherein the first display area and the second display area are set to different frame rates based at least in part on respective contents displayed in the first and second display areas;
controlling, by the proximity sensing controller, a first proximity sensing operation corresponding to the first portion of the sensing region based at least in part on first display information associated with the first display area; and
controlling, by the proximity sensing controller, a second proximity sensing operation corresponding to the second portion of the sensing region based at least in part on second display information associated with the second display area.

18. The method of claim 17, wherein the first proximity sensing operation differs from the second proximity sensing operation with respect to proximity sensing frequency or proximity sensing report rate.

19. The method of claim 17, wherein the display panel is configured to be foldable at a boundary between the first display area and the second display area.

20. The method of claim 17, wherein the display information is based on at least one of image data corresponding to an image to be displayed on the display panel, first and second display frame rates of the first and second display areas, a frequency of a horizontal sync signal, or a display mode.

* * * * *